United States Patent [19]
Takahashi et al.

[11] Patent Number: 5,536,427
[45] Date of Patent: Jul. 16, 1996

[54] NON-FLAMMABLE ELECTRIC DISCHARGE MACHINING FLUID INCLUDING A BLOCK COPOLYMER

[75] Inventors: Nobuyuki Takahashi; Makoto Sugai, both of Yokohama, Japan

[73] Assignee: Sodick Co., Ltd., Yokohama, Japan

[21] Appl. No.: 240,498

[22] Filed: May 10, 1994

Related U.S. Application Data

[63] Continuation of Ser. No. 965,754, Oct. 23, 1992.

[30] Foreign Application Priority Data

Oct. 23, 1991 [JP] Japan ..................... 3-275590

[51] Int. Cl.$^6$ ................................. C10M 173/00
[52] U.S. Cl. .................. 252/73; 252/351; 568/624; 508/557; 508/563; 508/579; 508/261
[58] Field of Search ................. 252/73, 52 A, 252/49.3, 174.21; 568/624

[56] References Cited

U.S. PATENT DOCUMENTS

| | | | |
|---|---|---|---|
| 2,674,619 | 4/1954 | Lundsted | 260/485 |
| 2,773,801 | 12/1956 | Fox | 568/624 |
| 2,774,735 | 12/1956 | Becher | 568/624 |
| 3,036,118 | 5/1962 | Jackson et al. | 568/624 |
| 3,146,272 | 8/1964 | Lloyd | 252/73 |
| 3,329,614 | 7/1967 | Milnes et al. | 252/75 |
| 3,346,501 | 10/1967 | Boehmer | 252/73 |
| 3,450,502 | 6/1969 | Hymes | 568/624 |
| 3,939,094 | 2/1976 | Kauffman | 568/624 |
| 3,997,458 | 12/1976 | Kurtz | 252/89 R |
| 4,518,512 | 5/1985 | Kanamori | 252/49.5 |
| 4,642,444 | 2/1987 | Inoue | 252/573 |
| 4,686,058 | 8/1987 | Schwartz et al. | 252/75 |
| 4,767,552 | 8/1988 | Sowerby | 252/46.3 |
| 4,767,906 | 8/1988 | Takahashi et al. | 252/174.21 |
| 4,781,847 | 11/1988 | Weitz | 252/49.3 |
| 5,041,622 | 8/1991 | Lesuer | 560/190 |
| 5,110,494 | 5/1992 | Beck | 252/156 |
| 5,141,664 | 8/1992 | Corring et al. | 252/90 |

FOREIGN PATENT DOCUMENTS

| | | |
|---|---|---|
| 60-71120 | 1/1985 | Japan. |
| 61-4623 | 6/1986 | Japan. |
| 62-94223 | 4/1987 | Japan. |
| 62-236625 | 10/1987 | Japan. |
| 62-251013 | 10/1987 | Japan. |
| 63-2618 | 1/1988 | Japan. |
| 1-257517 | 10/1989 | Japan. |
| 1-257517 | 10/1989 | Japan. |
| 2-139122 | 5/1990 | Japan. |
| 2-139121 | 5/1990 | Japan. |
| 9104820 | 4/1991 | WIPO. |

*Primary Examiner*—Paul Lieberman
*Assistant Examiner*—Gregory R. DelCotto
*Attorney, Agent, or Firm*—Marks & Murase

[57] ABSTRACT

A non-flammable electric discharge machining fluid for electric discharge machining which comprises a non-flammable water base solution, a block copolymer represented by the general formula:

$$HO(CH_2CH_2O)_m(\overset{\overset{\displaystyle CH_3}{|}}{C}HCH_2O)_n(CH_2CH_2O)_pH,$$

wherein n ranges from 1 to 5 and n/(m+p) ranges from 0.5 to 2.5. The fluid contributes to a lowered electrode wear rate and an improved machining removal rate.

6 Claims, 2 Drawing Sheets

NON-FLAMMABLE ELECTRIC DISCHARGE MACHINING FLUID INCLUDING A BLOCK COPOLYMER

This application is a continuation of application Ser. No. 07/965,754 filed Nov. 23, 1992.

FIELD OF THE INVENTION

This invention relates to an electric machining discharge fluid and, more particularly, to a non-flammable electric discharge machining fluid. Still more particularly, this invention relates to a machining fluid which reduces electrode wear and increases machining efficiency.

BACKGROUND OF THE INVENTION

In conventional electric discharge machining, a gap is formed between an electrode and a conductive workpiece to be machined (hereafter, referred to as "workpiece"). The gap is filled with an insulating medium and intermittent electric discharges are passed between the electrode and the workpiece. The insulating medium is an aqueous or non-aqueous electric discharge machining fluid. It is desirable that the machining fluid also help promote the safety of the machining process.

In industrial practice, electric discharge machining often takes place through continuous operation in a completely automated plant. Furthermore, in the practice of electric discharge machining, the surface temperature of the workpiece may rise excessively (e.g., to thousands of degrees). Accordingly, it is desirable to use an aqueous electric discharge machining fluid which will not lead to or increase the probability of fire.

There are, however, several disadvantages associated with the use of a non-flammable aqueous electric discharge machining fluid and, therefore, its use is limited in industrial practice. The disadvantages include as follows:

(a) As machining occurs, the electrode is worn away as well as the workpiece. It is indispensable, for precision machining, however, that the electrode wear rate be kept at or below 1%. During normal machining conditions using aqueous electric discharge machining fluid, the electrode wear rate is remarkably high and thus it is difficult to conduct precision machining.

(b) Uneven wear of the electrode also occurs during machining due, for example, to the electrolytic action which occurs when a plus potential is applied to a tool electrode while a minus potential is applied to the workpiece to be machined. The machining accuracy worsens as a result of uneven electrode wear.

(c) Machined iron particles mixed in the machining fluid as well as newly formed products can cause undesirable phenomena such as partial electrode wear, abnormal electrode wear and reduced resistivity. Consequently, abnormal discharges may occur and damage a workpiece. There may be no means, however, to prevent the formation of products which cause the abnormal electric discharges. As a result, machining fluid is circulated through a filtering apparatus and ion-exchange resins to remove the machined iron particles and the newly formed products as part of the recycling process. However, the ion-exchange resins conventionally reach their working capacity limit within a short period of time. The machining fluid must, therefore, be replaced frequently.

(d) Since the main ingredient of the aqueous electric discharge machining fluid is water, an unavoidable, partial electrolysis of water is involved during the electric discharge machining. During the electrolysis of the water, oxygen is produced forming an undesirable machining product.

The addition of additives and the like to the aqueous electric discharge machining fluid to improve the machining removal rate has not previously been effective since the ion-exchange resins have heretofore captured such additives. Therefore, although additives to improve the machining removal rate have previously been disclosed in Japanese Patent Publication No. 4253/1984 and Japanese Patent Application Laid-Open Nos. 94223/1987, 71120/1985, 4623/1986, 236623/1987, 236625/1987 and 2618/1988, these additives are not used in industrial practice because they are captured by ion-exchange resins.

Furthermore, it is generally recognized that the addition of material to the machining fluid for preventing the formation of products resulting from electric discharge machining is technically insignificant. Thus, the addition of such matter is not being carried out in industrial practice.

Thus, it is a problem in the prior art to provide a machining fluid which solves the above disadvantages, while maintaining electrode wear rate below 1% and greatly improving the machining removal rate.

SUMMARY OF THE INVENTION

It is an object of the present invention to provide a non-flammable electric discharge machining fluid which involves no uneven electrode wear and provides an electrode wear rate of less than 1%, while greatly improving the machining removal rate.

It is a further object of the present invention to provide a non-flammable electric discharge machining fluid having the additional advantage that the machining removal rate is greatly improved for long periods of use.

Additional objects, advantages and novel features of the invention will be set forth in the description which follows, and will become apparent to those skilled in the art upon reading this description or practicing the invention. The objects and advantages of the invention may be realized and attained by the invention of appended claims.

To achieve the foregoing and other objects, in accordance with the present invention, as embodied and broadly described herein, the non-flammable electric discharge machining fluid according to the present invention, comprises a block copolymer in a non-flammable base solution for electric discharge machining. The block copolymer is represented by the general formula (1):

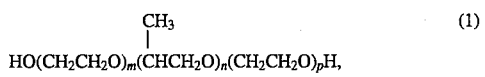

$$HO(CH_2CH_2O)_m(CHCH_2O)_n(CH_2CH_2O)_pH, \quad (1)$$

with $CH_3$ branch on the middle unit, wherein $n=1$ to 25 and $n/(m+p)=0.5$ to 2.5.

Further, a non-flammable electric discharge machining fluid according to another embodiment of the present invention comprises a substituted derivative of phenol nucleus and/or an amine derivative in addition to the block copolymer of the formula (1) in a non-flammable base solution for electric discharge machining.

BRIEF DESCRIPTION OF THE DRAWINGS

The accompanying drawings, which are incorporated in, and form a part of, the specification, illustrate an embodiment of the present invention and, together with the description serve to explain the principles of the invention. In the drawings.

DETAILED DESCRIPTION OF THE PREFERRED EMBODIMENTS

In the present invention, it has been discovered that, with respect to the effects of organic polymers on discharging conditions of aqueous electric discharge fluids, machining characteristics of the machining fluid, particularly electrode wear rate and machining removal rate, are profoundly affected by the structure of molecules of the organic polymers, the balance of the hydrophilic and hydrophobic properties of the organic polymer and the like.

Further, in the present invention, it has been discovered that if a copolymer of propylene oxide and ethylene oxide has a specified molecular structure (i.e., a block structure), if the molecular weight is within a required range, and if hydrophilic and hydrophobic properties of the polymer are within a required ratio, the electrode wear rate associated with an aqueous machining fluid containing the copolymer reaches a level significantly less than 1% while also providing an improvement in machining removal rate.

The non-flammable electric discharge machining fluid according to the present invention is an aqueous base solution into which a block copolymer represented by the formula (1) is dissolved.

The block copolymer is a copolymer of propylene oxide and ethylene oxide having a block structure wherein a polyethylene oxide chain is bonded to opposite ends of a polypropylene oxide chain. In other words, the block copolymer structure comprises two hydrophilic groups (i.e., the polyethylene oxide chains) bonded to both ends of a hydrophobic group (i.e., the polypropylene oxide chain).

The polypropylene oxide chain of the present invention comprises from 1 to 25 propylene oxide groups; in other words, n in the formula (1) comprises integers from 1 to 25.

Experimentally, it has been found that a condition for dissolving the block copolymer in water to provide a machining fluid is that the chain located at the center of the block copolymer is a chain of polypropylene oxide from 1 to 25 groups in length, depending on the degree of polymerization.

Moreover, as to the polyethylene oxide chains located at both ends of the block copolymer, it is desired that the total number of ethylene oxide groups (i.e., m+p) fulfills the relationship discussed above in connection with formula (1). That is, with respect to the total number of propylene oxide groups (i.e., n), the hydrophobic/hydrophilic group ratio (i.e., n/(m+p)) is to be in the range of 0.5 to 2.5. By adjusting the degree of polymerization of the polyethylene oxide chains to provide the required ratio with respect to that of the polypropylene oxide chain, a low electrode wear rate and a high machining removal rate can be realized.

Figure 1:
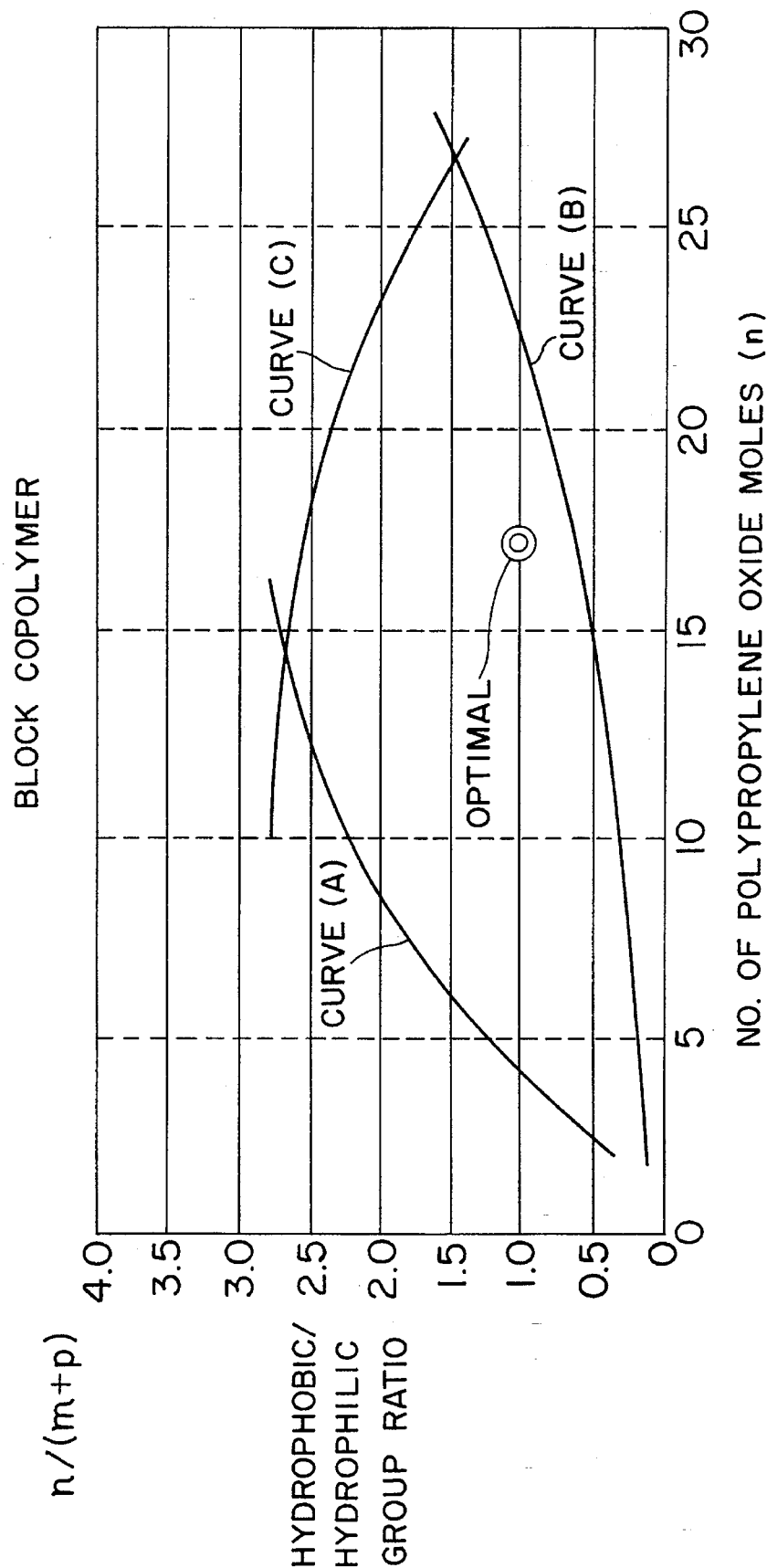
FIG. 1 is a graph showing the range suitable for electric discharge machining for the block copolymer of the formula (1).

FIG. 1 is a graph showing the suitable ranges for electric discharge machining fluid using the block copolymer according to formula (1) in terms of the hydrophobic/hydrophilic group ratio (i.e., n/(m+p)) and the number of propylene oxide groups (i.e., n). From the relationships shown in FIG. 1, a block copolymer of the formula (1) was defined. Curve (A) show the border at which the electrode wear rate becomes 1%. In the area below curve (A), the electrode wear rate is below 1%. Curve (B) shows the border at which the block copolymer itself changes from a liquid phase to a solid phase.. In the area of above curve (B), the block copolymer is a liquid. Curve (C) is a critical solubility curve of the block copolymer and water. In the area below curve (C), a preselected quantity of the block copolymer may dissolve in the water. Thus, the area where the electrode wear rate is below 1%, the block copolymer is liquid, and the block copolymer is soluble above a preselected level is bounded by the curves (A) through (C) as shown in FIG. 1. This area corresponds to a region where the number of propylene oxide groups (i.e., n) is an integer from 1 to 25 and where the hydrophobic/hydrophilic group ratio (i.e., n/(m+p)) is in the range of 0.5 to 2.5.

Moreover, in FIG. 1, the spot marked with a double circle shows the optimal point of decreasing electrode wear rate while improving machining removal rate. At this point, the number of propylene oxide groups (n) is 17 and the hydrophobic/hydrophilic group ratio (n/(m+p)) is 1.

Please note, however, that as the quantity of the block copolymer of the formula (1) dissolved in water increases, the viscosity of the machining fluid also increases, eventually exceeding the range of viscosity suitable for machining with that particular machining fluid. Thus, there is a limitation on the quantity of the block copolymer which may be dissolved in the water.

The non-flammable base solution used for the non-flammable electric discharge machining fluid according to the present invention is either water or a fluid primarily composed of water that is non-flammable due to the water. The water used in the base solution is pure water. Electric discharge machining fluid composed wholly or predominently of water provides a fluid suitable (e.g., with respect to viscosity) for electric discharge machining to which water-soluble matter can be added to the water. Additives for aqueous electric discharge machining may be provided so long as the effect of the dissolved block copolymer of formula (1) is not lost.

The volume ratio between the block copolymer of formula (1) and water for the non-flammable electric discharge machining fluid is 1/9 to 6/4 (block copolymer/water), preferably 2/8 to 4/6 and still more preferably 3.5/6.5.

The thus described non-flammable electric discharge machining fluid according to the present invention, with the block copolymer of formula (1) dissolved in the base solution, may result in electrode wear rate below 1% and an increase machining removal rate.

In a further embodiment of the present invention, electrode wear rate is further decreased and electric discharge machining may be carried out for longer periods of time at a higher machining removal rate by adding a substituted derivative of a phenol nucleus and/or an amine derivative. The life span of the ion-exchange resins which are generally used in the machining fluid recycling process for purifying machining fluids are also advantageous increased.

The addition of a substituted derivative of a phenol nucleus to the aqueous machining fluid to restrain the formation of products in electric discharge machining operations has previously been disclosed by the assignee of the present invention in Japanese Patent Application No. 171454/1991. Prior to this application, it was generally understood in the art that if additives were added to an aqueous machining fluid, they would be captured by the ion-exchange resins used for purifying the machining fluid in the recycling process and, thus, the addition of the additives was meaningless.

In the above application, it was shown that the novel feature of adding a substituted derivative of a phenol nucleus to the aqueous machining fluid restrained formation of products in the aqueous machining fluid due to the electric discharge machining process, and, as a result, various undesirable phenomena caused by the products were reduced. Further, if the substituted derivative of a phenol nucleus is contained in an aqueous machining fluid for producing electric discharges, after the substituted derivatives of a phenol nucleus have been passed in through the ion-exchange resins, they are released from the ion-exchange resins. Finally, in the above application, it was found that there was no restriction on the aqueous machining fluids to which the substitutive derivatives of phenol nucleus could be added.

In the present invention, it was found that the dissolution of a substituted derivative of a phenol nucleus and/or an amine derivative to the machining fluid comprising a block copolymer of the formula (1) in the base solution (water) resulted in a reduced electrode wear rate and a greatly improved machining removal rate, even where only a very small quantity of additives was used. Further, these effects persist for a long period of time, the working life of the machining fluid is prolonged, and the life span of the ion-exchange resins used in the recycling process of the machining fluid is increased. As an alternative to adding a water-soluble substituted derivative of a phenol nucleus, a water-insoluble oleophilic substituted derivative of a phenol nucleus can be dissolved in a water solution containing the block copolymer of formula (1), because the block copolymer of formula (1) has a polypropylene oxide chain which acts as an oleophilic group.

While the substituted derivative of a phenol nucleus may either be water-soluble or oleophilic, the water-soluble substituted derivative of a phenol nucleus is preferred because the non-flammable base solution is water or principally composed of water.

The substituted derivative of a phenol nucleus used in the invention is preferably a substituted derivative of a phenol nucleus wherein at least one of the hydrogen atoms bonded to the phenol nucleus is substituted by the substituent.

Moreover, while the phenol nucleus of the substituted derivative of a phenol nucleus preferably bears a monovalent phenol, a multivalent phenol of more than divalence may be used.

The substituent may be any substituent so far as it will not mar the effect of the invention, however, hydroxyl, alkyl, alkyloxy, nitro, amino, and aldehyde groups are desirable. Further, multiple hydrogen atoms of the phenol nucleus may be replaced by multiple substituents.

While alkyl radicals are used as the substituent, lower alkyl groups, for example, methyl and butyl, are desirable. For the butyl radical, a tert-butyl group is desirable. In addition, where alkyloxy radicals are used as the substituent, lower alkyl, for example, methoxy and ethoxy groups are desirable.

The substituted derivatives of a phenol nucleus used in this invention may be: ortho-cresol; 2,6-xylenol; 2,4,6-trimethylphenol; ortho-tert-butylphenol; 2,6-di-tert-butylphenol; 2,6-di-tert-butyl-4-methylphenol; hydroquinone; butylhydroxyanisole, and so forth. The 2,6-di-tert-butyl-4-methylphenol, however, is preferred.

Furthermore, either a single substituted derivative of a phenol nucleus or a plurality of differing substituted derivatives of a phenol nucleus may be added.

Moreover, while it is sufficient to use only substituted derivatives of a phenol nucleus, the substituted derivatives of a phenol nucleus may also be used jointly with amine derivatives. In even very small amounts, the joint use of substituted derivatives of a phenol nucleus and amine derivatives with the block copolymer of formula (1) restrains the formation of products during electric discharge machining operation.

The substituted derivative of a phenol nucleus may be added up to its solubility limit, and, in doing so, it is possible to increase the effects of the substituted derivative of a phenol nucleus. The quantity to be dissolved depends on the quantity of the block copolymer of formula (1) dissolved into water. The substituted derivative of a phenol nucleus is effective in concentrations as low as 50 ppm (determined with reference to the total weight of the block copolymer of formula (1) and the non-flammable base solution), with a further addition of up to about 3% by weight (determined with reference to the weight of the base solution) possible.

The dissolution of an amine derivative in a water solution of the block copolymer of the formula (1) has effects similar to those observed when a substituted derivative of a phenol nucleus is added. As with the substituted derivatives of a phenol nucleus, either water-soluble or oleophilic amine derivatives may be used. Moreover, the amine derivatives can be jointly used with the substituted derivatives of a phonel nucleus. The following amine derivatives may be used, for example:

di-secondary butyl-para-phenylenediamine, phenyl-α-naphthylamine, phenyl-β-naphthylamine, N,N'-di-β-naphthyl-para-phenylenediamine, N,N'-diphenyl-para-phenylenediamine, N,N'-diallyl-para-phenylenediamine, N-phenyl-N'-isopropyl-para-phenylenediamine, 6-ethoxy-2,2,4-trimethyl-1,2-dihydroquinoline.

The quantity of the amine derivative to be added is the same as for the substituted derivative of a phenol nucleus.

In the non-flammable electric discharge machining fluid according to the present invention, there is no restriction on the means by which the block copolymer of the formula (1) and the substituted derivatives of a phenol nucleus and/or amine derivatives may be dissolved into the non-flammable base solution.

The non-flammable electric discharge machining fluid according to the present invention may be used in connection with conventional aqueous machining fluids.

There are no restrictions on the method or manner in which a non-flammable electric discharge machining fluid according to the present invention can be used as compared to conventional aqueous machining fluids. The preferable method of use is a process involving draining the aqueous machining fluid from the working tank to purify it for recycling by filtering and deionizing it with ion-exchange resins. In addition, optional, purifying means may be provided for the recycling process of the aqueous machining fluid.

EXAMPLES

Table 1 shows the block copolymers used in the following examples. The numbers in Table 1 identifying the block copolymer are used solely for identification purposes. Machining fluids prepared using the block copolymers shown in Table 1 are assessed in Table 4.

TABLE 1

| Block copolymer | n | n/(m + p) | Mean mol. wt. |
|---|---|---|---|
| 1007 | 10 | 0.7 | 1200 |
| 1018 | 10 | 1.8 | 900 |
| 1712 | 17 | 1.2 | 1600 |
| 1718 | 17 | 1.8 | 1400 |
| 1727 | 17 | 2.7 | 1300 |
| 2112 | 21 | 1.2 | 2100 |

The experiment was conducted using the equipment listed in Table 2.

TABLE 2

| | |
|---|---|
| Electric Discharge Machine Model | Sodick H3 |
| Workpiece to be machined | SKD 61 |
| Tool electrode | Graphite ED-3 50 × 50 mm square |

The electric discharging conditions are shown in Table 3.

TABLE 3

| | |
|---|---|
| Current | 90A (in shorting) |
| τon | 320 μs |
| τoff | 32 μs |

Figure 2:
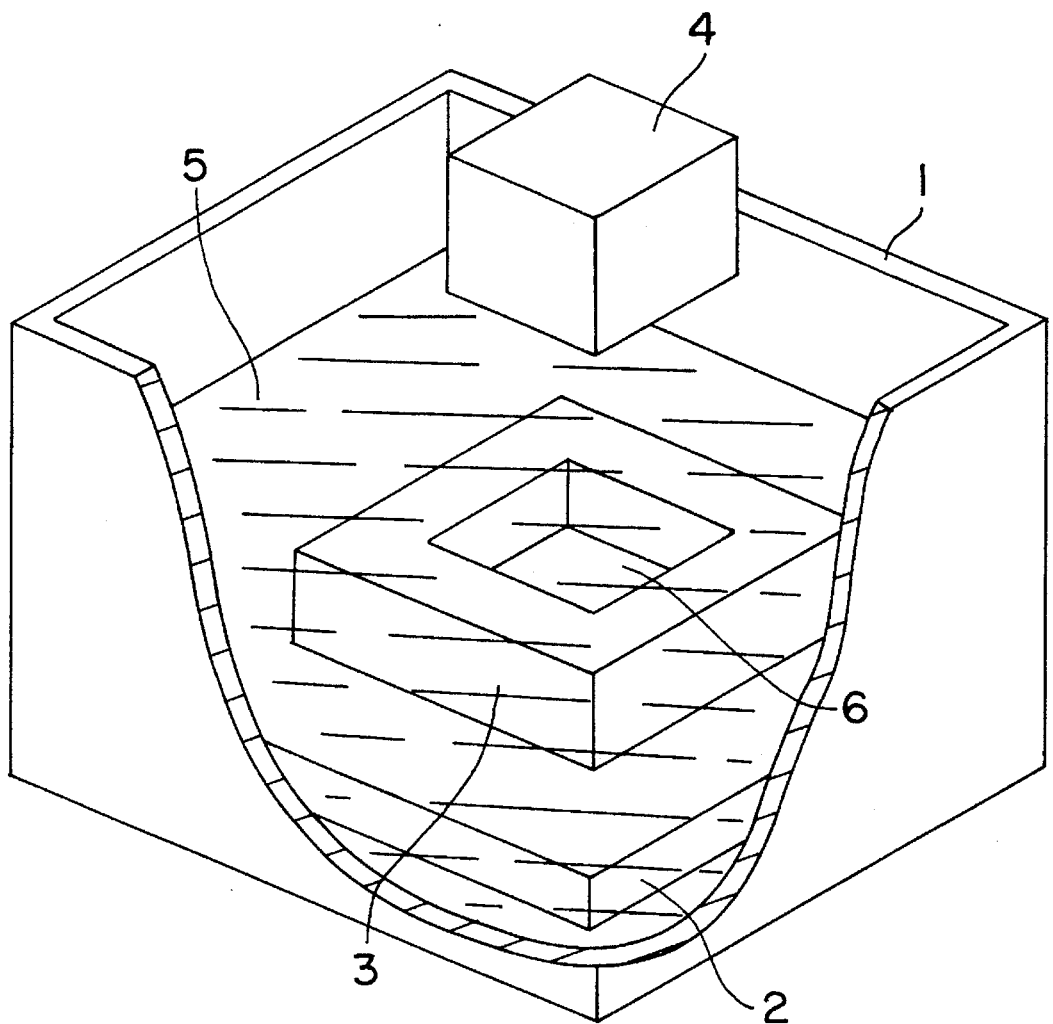
FIG. 2 is a drawing illustrating a partially cut away perspective view of the working tank.

As illustrated in FIG. 2, a work table 2 is provided in a working tank 1. A workpiece 3 is arranged on the work table 2 and a square tool electrode 4 is controlled for vertical motion to induce electric discharges between the electrode 4 and the surface of the workpiece 3. The working tank 1 holds machining fluid 5, and the workpiece 3 is immersed within the machining fluid 5. The tool electrode 4 machines a hole 6 that is 50 mm×50 mm square and has a depth of 10 mm.

The machining fluid 5 was reused during the electric discharge machining. The machining fluid was continuously drained from the working tank, collected in a storage tank, purified by circulating it through a filtering apparatus and further processing it with ion-exchange resins, and returned to the working tank 1 through a chiller.

Table 4 shows the experimental results of the above procedure. For machining fluids represented by numbers 1 through 8 in Table 4, 2,6-di-tert-butyl-4-methylphenol is added in a 50 ppm quantity with respect to the block copolymer and water. Since 2,6-di-tert-butyl-4-methylphenol is insoluble in the machining fluids represented by numbers 9 and 10, it was not added to these machining fluids. In Table 4, PEG 400 and PEG 600 mean polyethylene glycol of molecular weights of 400 and 600, respectively.

TABLE 4

| No. | Machining fluid | Electrode wear rate (%) | Machining removal rate (mm³/min) |
|---|---|---|---|
| 1 | (1007) 50% water 50% | 0.55 | 5.41 |
| 2 | (1018) 50% water 50% | 0.63 | 5.12 |
| 3 | (1012) 30% water 70% | 0.78 | 3.45 |
| 4 | (1712) 50% water 50% | 0.45 | 5.50 |
| 5 | (1712) 70% water 30% | 0.49 | 4.99 |
| 6 | (1718) 50% water 50% | 0.48 | 5.36 |
| 7 | (1727) 50% water 50% | 0.51 | 4.98 |
| 8 | (2112) 50% water 50% | 0.54 | 4.67 |
| 9 | (PEG400) 50% water 50% | 1.39 | 3.43 |
| 10 | (PEG600) 50% water 50% | 1.33 | 3.48 |

As can be seen from the results in Table 4, for machining fluids 1 to 8, which are within the group of the invention, electrode wear rate is lowered to a level significantly less than 1% and the machining removal rate is improved. Further, the decreased electrode wear rate and the improved machining removal rate are maintained, even when the machining fluids are continuously employed for electric discharge machining over a long period of time. Additionally, ion-exchange resins used in recycling the machining fluids could be employed for a long period of time without being replaced.

In contrast, the mass-marketed fluids which contain only a polyethylene glycol as an additive (i.e., machining fluid numbers 9 and 10), resulted in an unacceptable electrode wear rate of more than 1% and a low machining removal rate.

I claim:

1. An electric discharge machining fluid for electric discharge machining comprising a non-flammable water base solution; an effective amount to decrease electrode wear of a block copolymer of the formula:

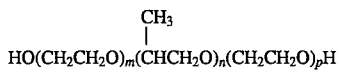

wherein n is in the range of from about 1 to 25 and n/(m+p) is in the range of from about 0.5 to 2.5 and both m and p are non-zero; one or more additives selected from the group consisting of:

di-secondary butyl-para-phenylenediamine, phenyl-α-naphthylamine, phenyl-β-naphthylamine, N,N'-di-β-naphthyl-para-phenylenediamine, N,N'-diphenyl-para-phenylenediamine, N,N'-diallyl-para-phenylenediamine, N-phenyl-N'-isopropyl-para-phenylenediamine, and 6-ethoxy-2,2,4-trimethyl-1,2-dihydroquinoline and, optionally, including a substituted derivative of a phenol nucleus.

2. The electric discharge machining fluid as set forth in claim 1, wherein the volume ratio between the block copolymer and the water base solution in the range of from about 1/9 to about 6/4.

3. The electric discharge machining fluid according to claim 1, wherein n is in the range of from about 10 to 20 and n/(m+p) is in the range of from about 0.5 to 2.5.

4. The electric discharge machining fluid according to claim 1, wherein said additive further comprises a phenol nucleus.

5. The electric discharge machining fluid according to claim 1, wherein the volume ratio between the block copolymer and the water base solution is in the range of from about 2/8 to about 4/6.

6. The electric discharge machining fluid according to claim 1, wherein the volume ratio between the block copolymer and the water base solution is about 3.5/6.5.

* * * * *